UNITED STATES PATENT OFFICE.

MORITZ ULRICH AND RICHARD LAUCH, OF ELBERFELD, GERMANY, ASSIGNORS TO THE FARBENFABRIKEN, VORMALS FR. BAYER & CO., OF SAME PLACE.

BLUE DYE.

SPECIFICATION forming part of Letters Patent No. 476,337, dated June 7, 1892.

Application filed November 19, 1891. Serial No. 412,428. (Specimens.) Patented in England August 29, 1889, No. 13,665; in Germany August 6, 1890, No. 57,912, and in France February 3, 1891, No. 200,520.

*To all whom it may concern:*

Be it known that we, MORITZ ULRICH and RICHARD LAUCH, chemists, doctors of philosophy, subjects of the German Emperor, residing at Elberfeld, Germany, and assignors to the FARBENFABRIKEN, VORMALS FR. BAYER & CO., of Elberfeld, in Germany, have invented a new and useful Improvement in the Manufacture of Direct Dyeing Coloring-Matters, (for which the said FARBENFABRIKEN have already obtained patents in Germany, No. 57,912, dated August 6, 1890; in England, No. 13,665, dated August 29, 1889, and in France, No. 200,520, dated February 3, 1891,) of which the following is a specification.

Our invention relates to the production of a very valuable direct dyeing azo coloring-matter by combining one molecule of tetrazo-diphenoldimethylether with one molecule of alpha-naphthylamine by further diazotising the thus-obtained product and by acting with the so-formed tetrazo chloride upon two molecules of the sodium salt of the 1.8 dihydroxynaphthaline monosulpho-acid S. This process takes place in two steps—first, from out molecular proportions of tetrazo-diphenoldimethylether and alpha-naphthylamine an intermediate product is formed, which corresponds to the formula:

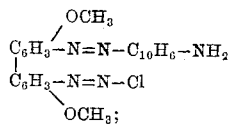

secondly, this product after having been diazotized is combined with two molecules of the sodium salt of the 1.8 dihydroxynaphthaline monosulpho-acid S. In this manner the coloring-matter of the following formula results:

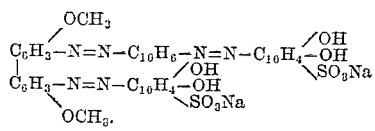

Carrying out our process practically we proceed as follows: A cold watery solution of 12.2 kilos of diamido-dimethoxydiphenyl or of the equivalent quantity of its sulphate is mixed with a watery solution containing seven kilos of sodium nitrite. The mixture then is acidulated, adding a small excess of hydrochloric acid in order to prepare the tetrazo chloride. The solution of the latter is allowed to flow into the watery solution of nine kilos of alpha-naphthylamine chlorhydrate, likewise in the presence of hydrochloric acid in a moderate excess. After some hours the formation of the intermediate product is finished. The latter can directly be diazotized in the hydrochloric-acid solution by the addition of 3.6 kilos of sodium nitrite dissolved in about twenty liters of water. When after about six hours the diazotation is completed, the resulting liquid is introduced into the watery solution of twenty-eight kilos of dihydroxynaphthaline monosulphonic sodium and of sixty kilos of sodium acetate. After some hours standing the whole mixture is heated for a short time in order to complete perfectly the formation of the dye-stuff. Thereupon the acetic-acid liquid is neutralized with sodium carbonate and the produced dye-stuff is salted out, filtered off, and dried.

Our new coloring-matter forms in dry state a grayish-black powder, which is difficultly soluble in cold, more easily in hot, water with bluish color. It dissolves in sodium carbonate with bluish color, in soda-lye and ammonia with deep-blue color. Out of its watery and alkaline solutions it separates on the addition of acids in blue flakes, while the liquid slowly becomes almost colorless. It is dissolved with greenish-blue color by concentrated sulphuric acid, and out of this sulphuric-acid solution a finely-powdered blue precipitate separates on the addition of water. In alkaline baths it produces on unmordanted cotton a clear indigo-blue.

Having thus described our invention and in what manner it can be performed, that which we claim as new, and desire to secure by Letters Patent, is—

1. The process of producing a new direct dyeing coloring-matter by combining molecular proportions of tetrazo-diphenoldimethylether and alpha-naphthylamine, diazotizing the thus-obtained product, and combining the resulting tetrazochloride with two molecular proportions of the sodium salt of the dihydroxynaphthaline monosulpho-acid S.

2. The new dye-stuff which possesses the composition—

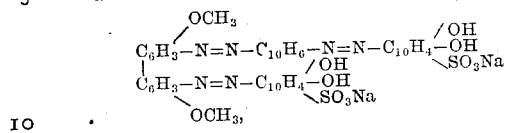

and which in a dry state forms a grayish-black powder, is difficultly soluble in cold, more easily in hot, water and sodium carbonate with bluish color, dissolving in soda-lye and ammonia with deep-blue color, and from its watery and alkaline solutions it separates on the addition of acids in blue flakes while the liquid slowly becomes almost colorless, is dissolved with greenish-blue color by concentrated sulphuric acid, from which a finely-powdered blue precipitate separates on the addition of water and which dyes unmordanted cotton in alkaline baths a pure indigo-blue.

In testimony whereof we have signed our names in the presence of two subscribing witnesses.

MORITZ ULRICH.
RICHARD LAUCH.

Witnesses:
WM. ESSENWEIN,
WM. DIESTET.